United States Patent
Miki (10) Patent No.: US 11,609,307 B2
(45) Date of Patent: Mar. 21, 2023

(54) OBJECT DETECTION APPARATUS, VEHICLE, OBJECT DETECTION METHOD, AND COMPUTER READABLE MEDIUM

(71) Applicant: MITSUBISHI ELECTRIC CORPORATION, Tokyo (JP)

(72) Inventor: Yohei Miki, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 311 days.

(21) Appl. No.: 16/967,388

(22) PCT Filed: Mar. 26, 2018

(86) PCT No.: PCT/JP2018/012107
§ 371 (c)(1),
(2) Date: Aug. 4, 2020

(87) PCT Pub. No.: WO2019/186641
PCT Pub. Date: Oct. 3, 2019

(65) Prior Publication Data
US 2021/0215797 A1    Jul. 15, 2021

(51) Int. Cl.
*G01S 7/48* (2006.01)
*G01S 17/42* (2006.01)
*G01S 17/931* (2020.01)

(52) U.S. Cl.
CPC .......... *G01S 7/4802* (2013.01); *G01S 7/4808* (2013.01); *G01S 17/42* (2013.01); *G01S 17/931* (2020.01)

(58) Field of Classification Search
CPC ...... G01S 17/931; G01S 13/931; G01S 17/42; G01S 17/89; G01S 7/4802; G01S 17/86;
(Continued)

(56) References Cited

U.S. PATENT DOCUMENTS

| 2009/0135047 A1 | 5/2009 | Matsuura et al. |
| 2012/0242799 A1 | 9/2012 | Saito |
| 2014/0035777 A1 | 2/2014 | Kim et al. |

FOREIGN PATENT DOCUMENTS

| DE | 10 2011 087 751 A1 | 6/2012 |
| DE | 10 2012 102 320 A1 | 9/2012 |

(Continued)

OTHER PUBLICATIONS

Rieken, Jens, Richard Matthaei, and Markus Maurer. "Benefits of using explicit ground-plane information for grid-based urban environment modeling." 2015 18th International Conference on Information Fusion (Fusion). IEEE, 2015. (Year: 2015).*

(Continued)

*Primary Examiner* — Yoshihisa Ishizuka
*Assistant Examiner* — Carter W Ferrell
(74) *Attorney, Agent, or Firm* — Birch, Stewart, Kolasch & Birch, LLP (57) ABSTRACT

In an object detection apparatus (10), a sorting unit (20) obtains data indicating a measurement result of a distance of each signal that a sensor (51) radiated from the sensor (51). The sorting unit (20) sorts the data obtained into first data indicating that the distance was not measured, second data indicating a distance to one or more obstacles, and third data indicating a distance to the ground. A determination unit (30), by referring to the third data, determines whether or not the ground exists in a first area which is a radiation destination area of a signal corresponding to the first data. An estimation unit (40) estimates, when the determination unit (30) determines that the ground exists in the first area, and when the first area and a second area, which is a radiation destination area of a signal corresponding to the second data, are adjacent, that one obstacle exists straddling the first area and the second area.

8 Claims, 9 Drawing Sheets

(58) Field of Classification Search
CPC ........ G01S 13/86; G01S 13/867; G01S 17/00; G01S 7/87; G01S 7/4808; G01S 7/41; G01S 13/93; G01S 15/931; B60W 2420/42; B60W 2420/52; G06T 2207/30261; G06T 2207/10028; G06T 7/70; G06T 2207/30252; G06T 7/11; G08G 1/16; G08G 1/166; G08G 1/165; G06V 20/58; G06V 20/56; G06V 20/588
See application file for complete search history.

(56) References Cited

FOREIGN PATENT DOCUMENTS

| | | |
|---|---|---|
| DE | 10 2012 223 675 A1 | 2/2014 |
| EP | 2 058 678 A2 | 5/2009 |
| JP | 2007-126025 A | 5/2007 |
| JP | 2010-271166 A | 12/2010 |
| JP | 2017-106806 A | 6/2017 |
| JP | 2017166971 A * | 9/2017 |

OTHER PUBLICATIONS

German Office Action for German Application No. 112018007135.9, dated Apr. 30. 2021, with English translation.
International Search Report for PCT/JP2018/012107 (PCT/ISA/210) dated May 15, 2018.

* cited by examiner

OBJECT DETECTION APPARATUS, VEHICLE, OBJECT DETECTION METHOD, AND COMPUTER READABLE MEDIUM

TECHNICAL FIELD

The present invention relates to an object detection apparatus, a vehicle, an object detection method, and an object detection program.

BACKGROUND ART

In Patent Literature 1, technology is disclosed where even if there is a place on an object that is not detected as a detected point even when radiated with a search wave, the object is recognized as the same object.

CITATION LIST

Patent Literature

Patent Literature 1: JP 2017-106806 A

SUMMARY OF INVENTION

Technical Problem

When a sensor such as LiDAR, which measures scattered light of a laser radiation that flashes light in pulses and analyzes a distance to a target in a long distance along with properties of the target, is used, there is a case where even if actually radiated with light, the light does not return in the sensor's direction depending on a characteristic of the object that is to be a target or which way a surface of the object is facing. "LiDAR" is an abbreviation for Laser Imaging Detection and Ranging.

When a surrounding object is to be detected with the sensor as described above, if there is an object that includes a part that is actually difficult to reflect light, the object becomes detected being separated and an object recognition accuracy is lowered. In the technology described in Patent Literature 1, when a detected point is not detected in an adjacent direction that is adjacent to a detection direction where a detected point is detected in a detection result of this time, and it is determined that a detected point exists in the adjacent direction, an object is recognized by assuming that the detected point of an object the detected point detected this time in the detection direction indicates exists in the adjacent direction. In the technology described in Patent Literature 1, however, since the object is recognized as existing by using information of an adjacent point of an undetected point, if there is an object in the adjacent direction, a place that became an undetected point because there is actually no object is also filled with information of that object more than necessary and incorrectly recognized as if one large object exists even in a case where there are plurality of objects.

The present invention aims to improve accuracy in detecting an object.

Solution to Problem

An object detection apparatus according to one aspect of the present invention includes:

a sorting unit to obtain data indicating a measurement result of a distance of each signal from a sensor that measures a distance by observing reflected waves of a plurality of signals radiated toward areas different from each other, and to sort the data obtained into first data indicating that the distance was not measured, second data indicating a distance to one or more obstacles, and third data indicating a distance to the ground;

a determination unit to determine by referring to the third data, whether or not the ground exists in a first area which is a radiation destination area of a signal corresponding to the first data; and an estimation unit to estimate, when the determination unit determines that the ground exists in the first area, and when the first area and a second area, which is a radiation destination area of a signal corresponding to the second data, are adjacent, that one obstacle exists straddling the first area and the second area.

Advantageous Effects of Invention

In the present invention, in a case where the ground is determined as existing in a first area which was not measured of a distance, and where the first area and a second area, which was measured of a distance to an obstacle, are adjacent, it is estimated that the obstacle exists straddling the first area and the second area. Consequently, in a case where an object in surroundings is to be detected with a sensor, even if there is an object that includes a part that is actually difficult to reflect light, the object is not detected being separated. Therefore, according to the present invention, accuracy in detecting an object will improve.

DESCRIPTION OF EMBODIMENTS

Embodiments of the present invention will be described hereinafter using the drawings. Throughout the drawings, the same or corresponding portions are denoted by the same reference signs. In the description of the embodiments, description of the same or corresponding portions will be suitably omitted or simplified. Note that the present invention is not limited to the embodiments to be described hereinafter, and various modifications are possible as necessary. For example, two or more embodiments of the embodiments to be described hereinafter may be implemented in combination. Alternatively, one embodiment or a combination of two or more embodiments of the embodiments to be described hereinafter may be partially implemented.

Embodiment 1

This embodiment will be described using FIG. 1 to FIG. 8.

*Description of Configuration*

Figure 1:
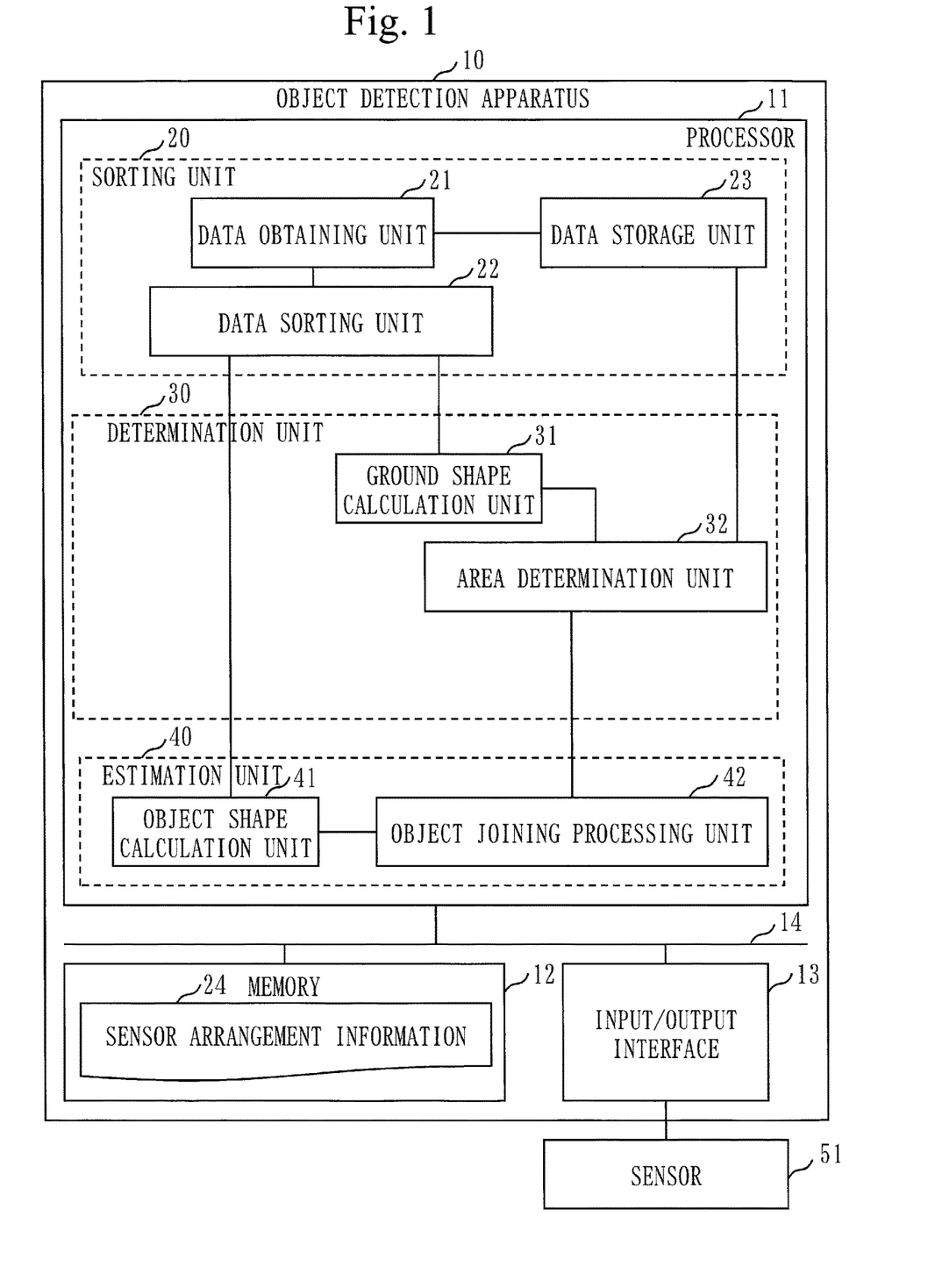
FIG. 1 is a block diagram illustrating a configuration of an object detection apparatus according to Embodiment 1.

A configuration of an object detection apparatus 10 according to this embodiment will be described by referring to FIG. 1.

The object detection apparatus 10 is a computer. The object detection apparatus 10 is an in-vehicle computer in this embodiment, but the object detection apparatus 10 may be a server computer arranged in a remote location such as a cloud server. On a vehicle to which the object detection apparatus 10 is loaded, a sensor 51 such as LiDAR is also loaded. The object detection apparatus 10 is connected to the sensor 51 by wire or wirelessly.

The object detection apparatus 10 includes a processor 11 and also other hardware such as a memory 12 and an input/output interface 13. The processor 11 is connected to other hardware via signal lines 14 and controls these other hardware.

The object detection apparatus 10 includes, as functional elements, a sorting unit 20, a determination unit 30, and an estimation unit 40. The sorting unit 20 includes a data obtaining unit 21, a data sorting unit 22, and a data storage unit 23. The determination unit 30 includes a ground shape calculation unit 31 and an area determination unit 32. The estimation unit 40 includes an object shape calculation unit 41 and an object joining processing unit 42. Functions of the sorting unit 20, the determination unit 30, and the estimation unit 40 are realized by software. Specifically, the functions of the sorting unit 20, the determination unit 30, and the estimation unit 40 are realized by an object detection program. The object detection program is a program that makes a computer execute processes performed by the sorting unit 20, the determination unit 30, and the estimation unit 40 as a sorting process, a determination process, and an estimation process, respectively. The object detection program may be provided being recorded in a computer-readable medium or provided being stored in a recording medium, or provided as a program product.

The processor 11 is a device that executes the object detection program. The processor 11 is for example, a CPU. "CPU" is an abbreviation for Central Processing Unit.

The memory 12 is a device that stores the object detection program beforehand or temporarily. The memory 12 is, for example, a RAM, a flash memory, or a combination of these. "RAM" is an abbreviation for Random Access Memory.

The input/output interface 13 includes a receiver that receives data inputted into the object detection program and a transmitter that transmits data outputted from the object detection program. The input/output interface 13 is a circuit that obtains data from the sensor 51 according to an instruction from the processor 11. The input/output interface 13 is, for example, a communication chip or an NIC. "NIC" is an abbreviation for Network Interface Card.

The object detection apparatus 10 may further include an input device and a display as hardware.

The input unit is a device that is operated by a user for inputting data into the object detection program. The input unit is, for example, a mouse, a keyboard, a touch panel, or a combination of some or all of these.

The display is a device that displays data outputted from the object detection program on a screen. The display is, for example, an LCD. "LCD" is an abbreviation for Liquid Crystal Display.

The object detection program is read into the processor 11 from the memory 12 and executed by the processor 11. Not only the object detection program but also an OS is stored in the memory 12. "OS" is an abbreviation for Operating System. The processor 11 executes the object detection program while executing the OS. A part or all of the object detection program may be built into the OS.

The object detection program and the OS may be stored in an auxiliary storage device. The auxiliary storage device is, for example, an HDD, a flash memory, or a combination of these. "HDD" is an abbreviation for Hard Disk Drive. If stored in the auxiliary storage device, the object detection program and the OS are loaded into the memory 12 and executed by the processor 11.

The object detection apparatus 10 may include a plurality of processors that replace the processor 11. These plurality of processors share execution of the object detection program. Each processor is, for example, a CPU.

Data, information, signal values, and variable values used, processed, or outputted by the object detection program are stored in the memory 12, the auxiliary storage device, or a register or a cache memory in the processor 11. Especially, data, a calculation result of the object detection program, and sensor arrangement information 24 that can be obtained by the input/output interface 13 are stored in the memory 12. Position information and posture information of the sensor 51 are included in the sensor arrangement information 24. Data and information stored in the memory 12 are inputted or outputted according to a request from the processor 11.

The object detection apparatus 10 may be configured of one computer, or may be configured of a plurality of computers. If the object detection apparatus 10 is configured of a plurality of computers, the functions of the sorting unit 20, the determination unit 30, and the estimation unit 40 may be realized by being distributed to each computer.

*Description of Operation*

Operation of the object detection apparatus 10 and the sensor 51 according to this embodiment will be described by referring to FIG. 1 to FIG. 8. By combining the operation of the object detection apparatus 10 and the operation of the sensor 51, an object detection method according to this embodiment is realized.

Figure 2:
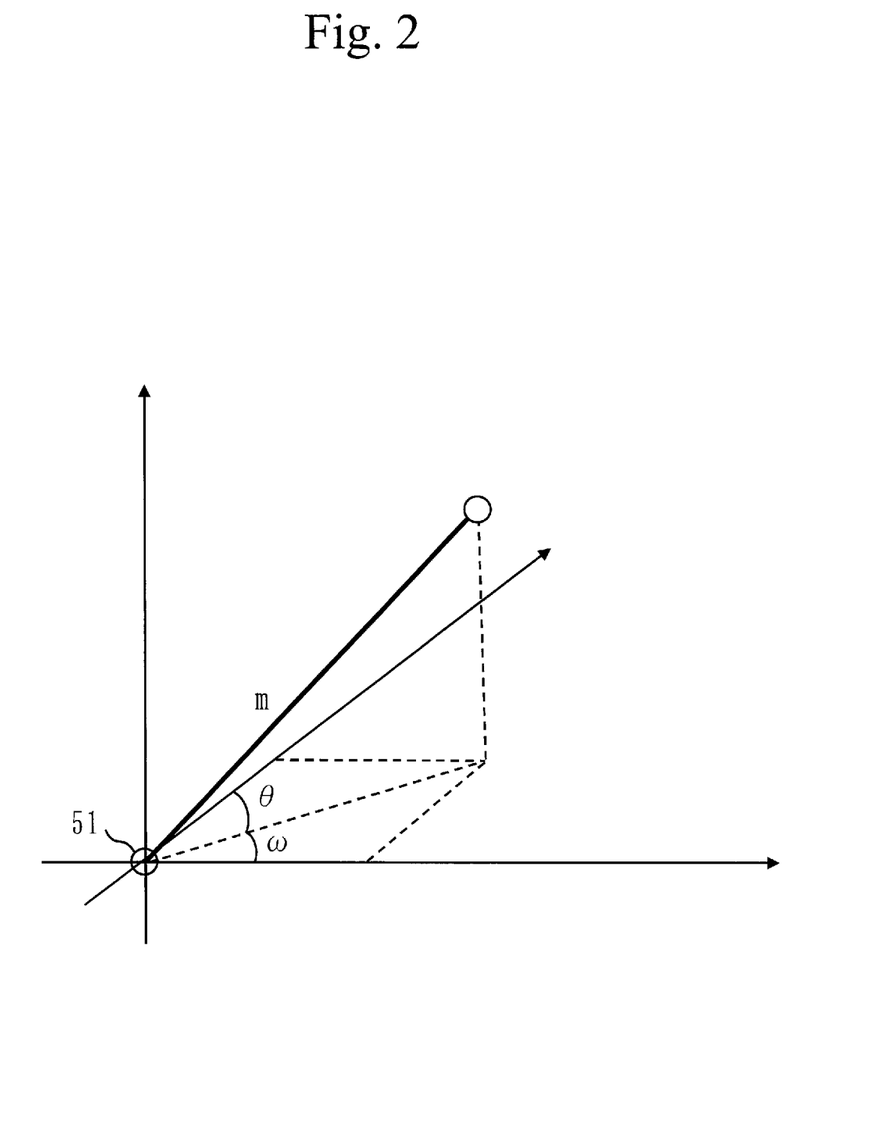
FIG. 2 is a diagram illustrating an example of obtained data in a sensor according to Embodiment 1.

The sensor 51 radiates a plurality of signals. These plurality of signals are radiated toward areas different from each other. The sensor 51 measures a distance by observing reflected waves of the plurality of signals radiated. Specifically, the sensor 51, as illustrated in FIG. 2, measures a distance m to an obstacle at each angle $(\theta, \omega)$ with the sensor 51 in a center.

The sensor 51 generates data indicating a measurement result of the distance of each signal radiated. The sensor 51 transmits the data generated to the object detection apparatus 10.

Figure 3:
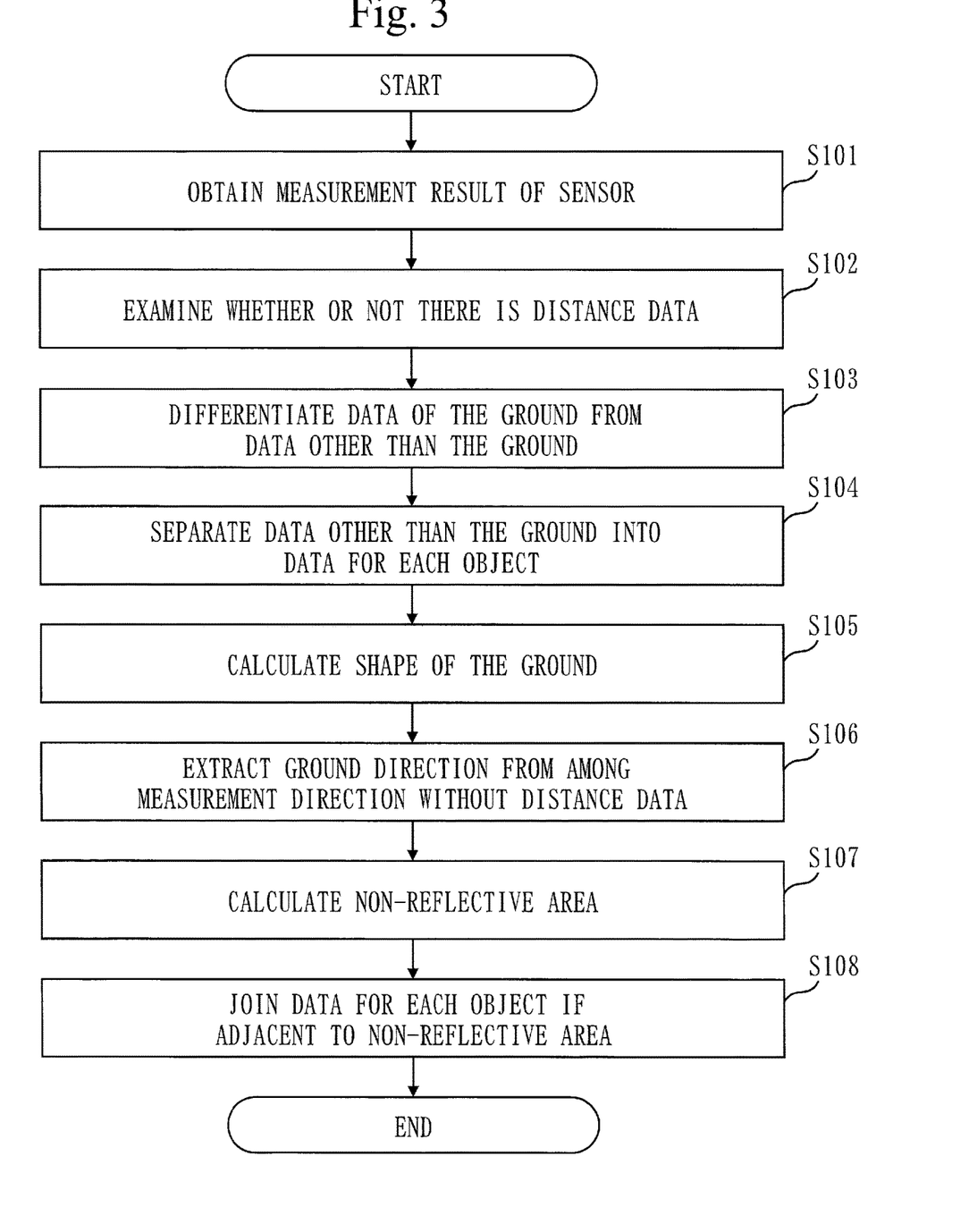
FIG. 3 is a flowchart illustrating operation of the object detection apparatus according to Embodiment 1.

FIG. 3 illustrates the operation of the object detection apparatus 10.

At step S101, the sorting unit 20 obtains the data indicating the measurement result of the distance of each signal the sensor 51 radiated from the sensor 51.

Specifically, at step S101, the data obtaining unit 21 obtains information on a distance to an object in each direction obtained by the sensor 51 via the input/output interface 13. The data to be obtained, as illustrated in FIG. 2, is the distance m to an obstacle at each angle (θ, ω) with the sensor 51 in the center.

At step S102 to step S104, the sorting unit 20 sorts the data obtained at step S101 into first data indicating that the distance was not measured, second data indicating the distance to one or more obstacles, and third data indicating a distance to the ground.

Specifically, at step S102, the data obtaining unit 21 examines whether or not there is distance data in the data obtained. Depending on an examination result, the data having the distance data is transmitted to the data sorting unit 22 and the data not having the distance data is transmitted to the data storage unit 23. The data storage unit 23 extracts a direction that the distance data could not be obtained and stores information indicating the direction extracted in the memory 12.

Figure 4:
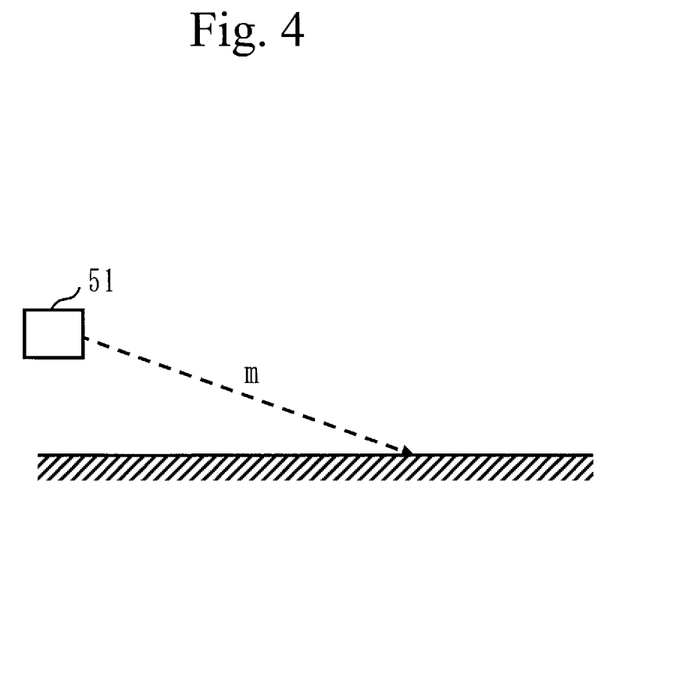
FIG. 4 is a diagram illustrating an example of a measurement direction and a measured distance from the sensor to the ground according to Embodiment 1.

And, at step S103, for the data the distance to the object was able to be obtained among the data obtained by the data obtaining unit 21, the data sorting unit 22 distinguishes whether or not the data is a part of the ground. More specifically, the data sorting unit 22 determines whether the data received is the ground or an object. Determining whether the data is the ground or an object may be performed by an arbitrary method, but in this embodiment, as illustrated in FIG. 4, the determination is performed by finding the distance m to the ground if a measurement direction is known when assuming that a surrounding area of the sensor 51 is a plane. For difference between the distance data found and actual measured data, data within a threshold can be determined as the ground. The determination by the threshold may be performed by finding, based on the data obtained, a plane where a sum of squares of distances to points is minimal, and then finding in the data, distances to the plane found. Finding a plane with the data of adjacent points may be repeated a plurality of times to handle a slope.

Figure 5:
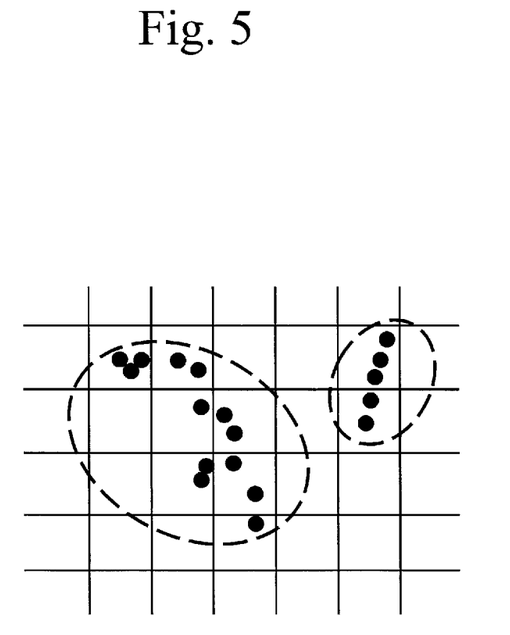
FIG. 5 is a diagram illustrating an example of a separation method of measured data of the object detection apparatus according to Embodiment 1.

And, at step S104, the object shape calculation unit 41 stores in the memory 12, the data distinguished as not the ground by the data sorting unit 22 and furthermore, performs a process to divide an assembled points into individual objects. More specifically, the object shape calculation unit 41 sorts the data received into data for each object, and finds a position of where each object is. For a method to sort the data by object, an arbitrary method may be used, but in this embodiment, as illustrated in FIG. 5, a method is used where a grid on a two-dimensional plane is defined, and if data exists in an adjacent grid, the data is recognized as one object.

A part or all of the processes from step S105 to step S107 may be performed before the process at step S104.

From step S105 to step S107, the determination unit 30 determines whether or not the ground exists in a first area which is a radiation destination area of a signal corresponding to the first data by referring to the third data.

In this embodiment, the determination unit 30 calculates a shape of the ground within an entire radiation destination area of the plurality of signals the sensor 51 radiated, by using the third data. The determination unit 30 determines whether or not the ground exists in the first area based on a calculation result of the shape of the ground.

Specifically, at step S105, the ground shape calculation unit 31 stores in the memory 12, the data determined as the ground by the data sorting unit 22, and calculates a ground shape. More specifically, the ground shape calculation unit 31 calculates the shape of the ground using the data received. The ground shape calculation unit 31 estimates a position of the ground based on measured data of surroundings for the area the ground was not measured, by calculating the shape of the ground, using the data determined as data of the ground.

Figure 6:
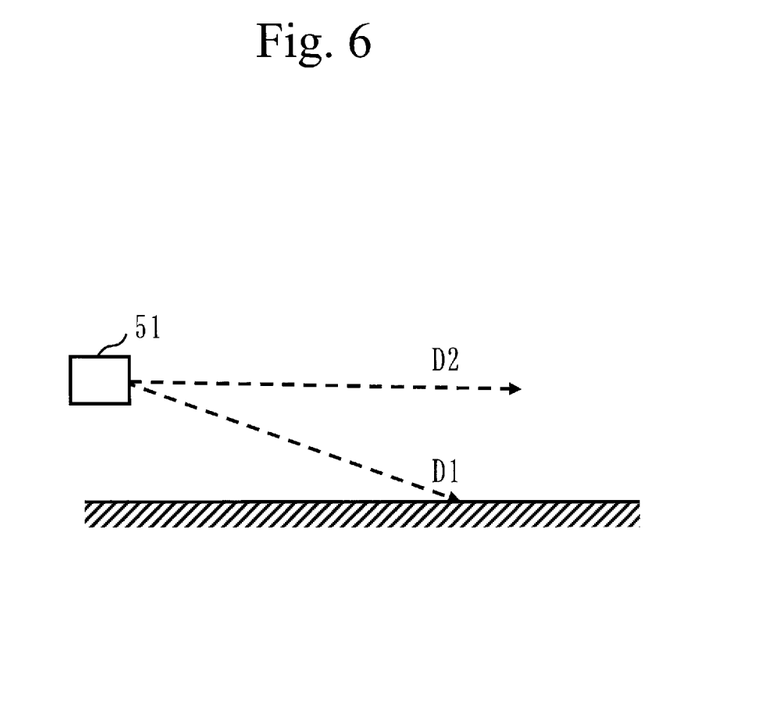
FIG. 6 is a diagram illustrating an example of sorting when there is no distance data in the sensor according to Embodiment 1.

And, at step S106, the area determination unit 32 determines whether or not information of a direction the distance data could not be obtained stored in the memory 12 by the data storage unit 23 crosses the ground calculated by the ground shape calculation unit 31. More specifically, for the data without the distance information, the area determination unit 32 extracts the data without the distance data in the measurement toward a ground direction from the sensor 51 based on ground shape data found by the ground shape calculation unit 31 and the position information of the sensor 51 included in the sensor arrangement information 24. As illustrated in FIG. 6, if a sensing direction of the data extracted is in a direction of the ground D1, when light is not reflecting off the ground, it can be assumed that there is an object with low light reflection. That is, since the ground exists at least in an area closer than a measurable distance of LiDAR in the direction of the ground D1, it can be determined that there is an object, but the light did not reflect off and return when there is no measured value. On the other hand, if the sensing direction of the data extracted is in a direction other than the direction of the ground D2, there is a case where there is not an object that reflects light. That is, there is a case where there no object in the area closer than the measurable distance in the direction other than the direction of the ground D2.

Figure 7:
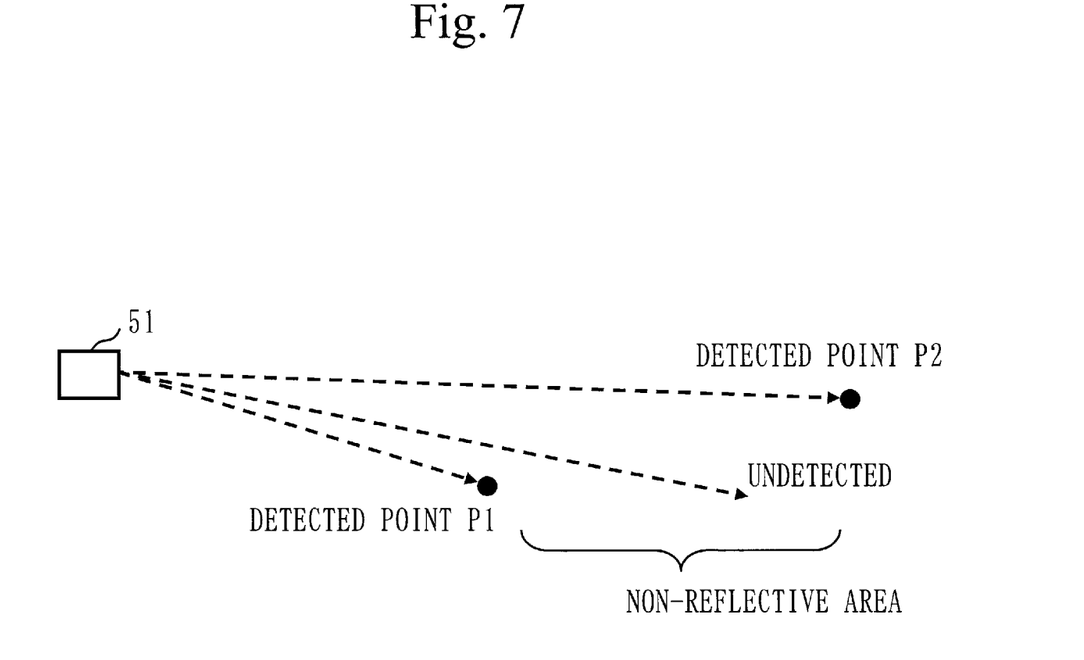
FIG. 7 is a diagram illustrating an example of a defining method of a non-reflective area of the object detection apparatus according to Embodiment 1.

And, at step S107, for the information of the direction the distance data could not be obtained stored in the memory 12 by the data storage unit 23, the area determination unit 32 determines there is an object that does not reflect light and calculates an area where there is a possibility of an object existing, with regard to the direction that crosses the ground. More specifically, the area determination unit 32 estimates a non-reflective area by using the data extracted at step S106 and ground data. The non-reflective area, as illustrated in FIG. 7, can be defined as an area surrounded by detected points that were able to obtain the distance data with regard to the direction extracted at step S106.

At step S108, if a determination is made by the determination unit 30 that the ground exists in the first area, and if the first area and a second area, which is a radiation destination area of a signal corresponding to second data, are adjacent to each other, the estimation unit 40 estimates that one obstacle X exists straddling the first area and the second area.

Especially, if two or more signals corresponding to the second data are in the plurality of signals the sensor 51 radiated, and if, as the second area, a pair of second areas are adjacent to both sides of the first area, the estimation unit 40 estimates that the one obstacle X exists straddling the first area and the pair of second areas.

In the present embodiment, the estimation unit 40 calculate a shape of the one obstacle X in the pair of second areas by using the second data. The estimation unit 40 estimates the shape of the one obstacle X in the first area based on a calculation result of the shape of the one obstacle X. The estimation unit 40 joins the calculation result and an estimation result of the shape of the one obstacle X.

Figure 8:
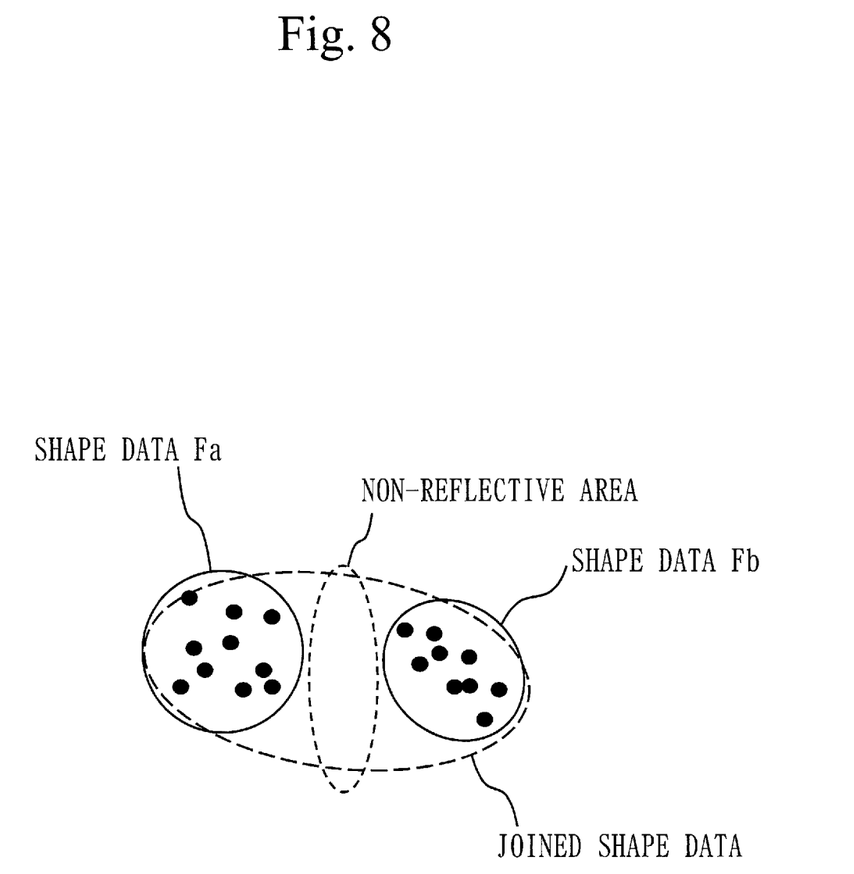
FIG. 8 is a diagram illustrating an example of a joining method of shape data of an object of the object detection apparatus according to Embodiment 1.

Specifically, at step S108, the object joining processing unit 42 confirms whether or not the non-reflective area calculated by the area determination unit 32 is adjacent to the area where the object the object shape calculation unit 41 found at S104 exists, expands the area where the object exists if the area is adjacent, and joins objects being separated. More specifically, the object joining processing unit 42, with regard to shape data of the object found by the object shape calculation unit 41, shapes of the objects are connected together if the non-reflective area found by the area determination unit 32 is adjacent. As illustrated in FIG. 8, if shape data Fa and shape data Fb exist, and if the non-reflective area exists adjacent to these, the object joining processing unit 42 detects the shape data Fa and shape data Fb as one object.

\*\*\*Description of Effect of Embodiment\*\*\*

In this embodiment, if the ground is determined as existing in the first area which was not measured of the distance and if the first area and the second area, which was measured of the distance to the obstacle X, are adjacent, the obstacle X is estimated as existing straddling the first area and the second area. Consequently, in a case where an object in the surroundings is to be detected with the sensor 51, even if there is an object that includes a part that is actually difficult to reflect light, the object is not detected being separated. Therefore, according to this embodiment, accuracy in detecting an object will improve.

In this embodiment, an undetected area is defined for a case where a distance was undetected in a detection direction of the ground direction based on ground information, which is a shape of the ground calculated based on all information of one frame obtained by the sensor 51, and arrangement information of the sensor 51. If an object has been detected in the surroundings, to have the undetected area joining an object detected area, a result of finding a shape of an object based on detected data can be prevented from being separated even in a case where an object having a part that is difficult to reflect light is to be detected. If a distance is undetected in a beam direction not in the ground direction, the undetected area is not defined, and a detected area of an object can be prevented from being expanded excessively. That is, results calculated as objects are prevented from joining more than necessary, and incorrect detection can be reduced.

In this embodiment, the object detection apparatus 10 detects an object based on information that the sensor 51 outputs. Specifically, the ground shape calculation unit 31 calculates the ground shape based on distance information from the sensor 51 to an obstacle in each direction and the sensor arrangement information 24. The area determination unit 32 extracts the direction found based on the ground shape calculated by the ground shape calculation unit 31 from among the beam directions that could not be detected, and determines the non-reflective area. The object joining processing unit 42 joins object data when non-reflective area calculated by the area determination unit 32 is adjacent to the area calculated as a block for each object based on data distinguished as data of an object.

For the direction the distance data could not be obtained, the area determination unit 32 specifies a non-reflective area where there is a possibility of an object with low reflective property existing by taking advantage of a measurement that could not be taken even though there is an object, based on the ground shape found based on the distance data of the surroundings that could be obtained, and the arrangement information of the sensor 51.

If shape data of an object found based on the data the distance data could be obtained and the non-reflective area found by the area determination unit 32 are adjacent, the object joining processing unit 42 connects the shapes of the object and prevents the object from being detected being separated.

By using the method as described above, in a case where an object having a part that is difficult to reflect light is to be detected as well, along with preventing a result of finding a shape of an object based on detected data from being separated, the results calculated as an object can be prevented from joining more than necessary, and incorrect detection can be reduced.

\*\*\*Other Configurations\*\*\*

In this embodiment, the functions of the sorting unit 20, the determination unit 30, and the estimation unit 40 are realized by software, but as a variation, the functions of the sorting unit 20, the determination unit 30, and the estimation unit 40 may be realized by hardware. With regard to this variation, difference from this embodiment will mainly be described.

Figure 9:
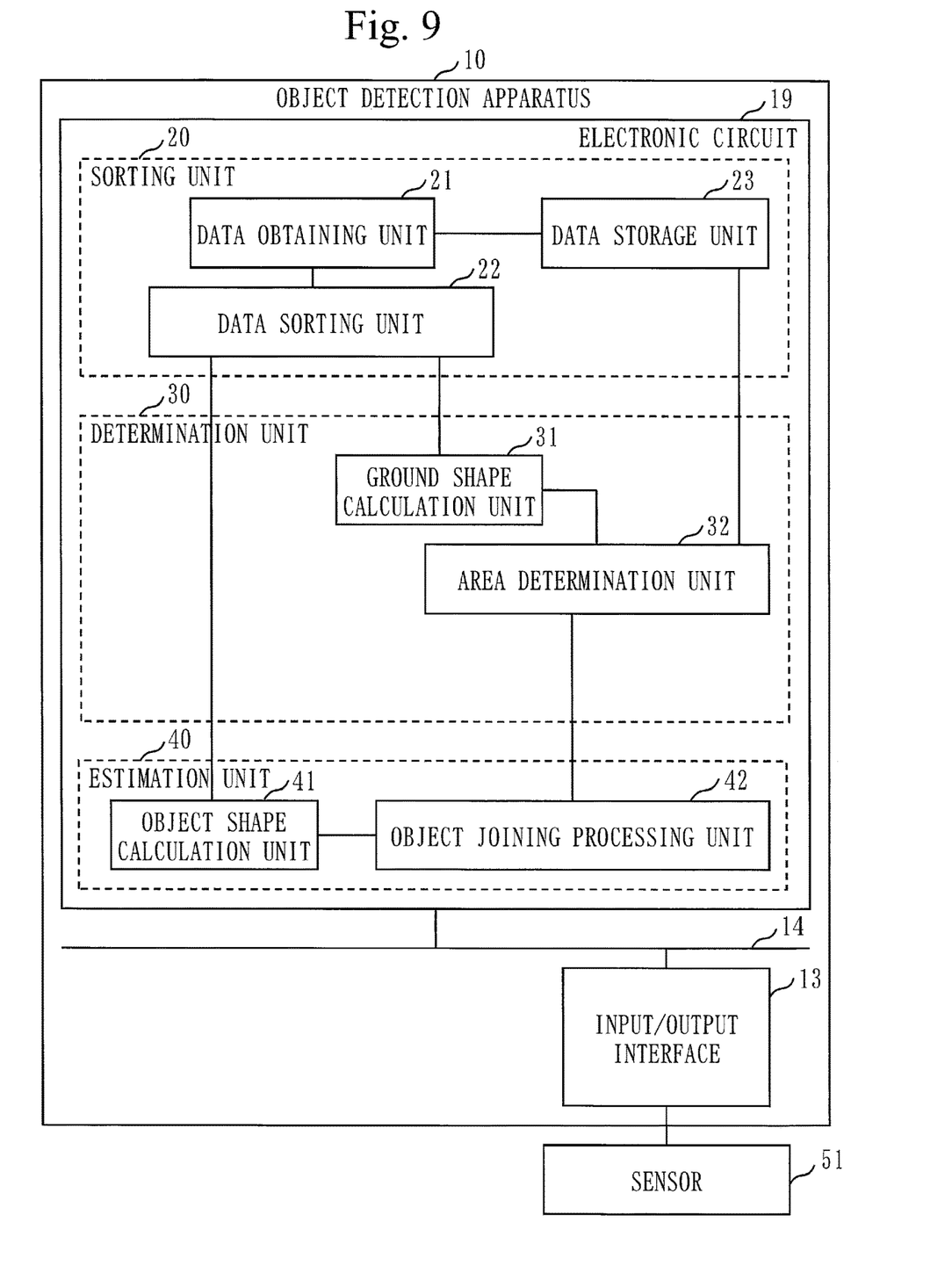
FIG. 9 is a block diagram illustrating a configuration of an object detection apparatus according to a variation of Embodiment 1.

A configuration of an object detection apparatus 10 according to the variation of this embodiment will be described by referring to FIG. 9.

The object detection apparatus 10 includes hardware such as an electronic circuit 19 and the input/output interface 13.

The electronic circuit 19 is dedicated hardware that realizes the functions of the sorting unit 20, the determination unit 30, and the estimation unit 40. The electronic circuit 19 is, for example, a single circuit, a composite circuit, a programmed processor, a parallel programmed processor, a logic IC, a GA, an FPGA, an ASIC, or a combination of some or all of these. "C" is an abbreviation for Integrated Circuit. "GA" is an abbreviation for Gate Array. "FPGA" is an abbreviation for Field-Programmable Gate Array. "ASIC" is an abbreviation for Application Specific Integrated Circuit.

Although not illustrated, the sensor arrangement information 24 is stored in the data storage unit 23 of the sorting unit 20 beforehand. Functions of the data storage unit 23 are realized by an internal memory of the electronic circuit 19.

The object detection apparatus 10 may include a plurality of electronic circuits that replace the electronic circuit 19. These plurality of electronic circuits, as a whole, realize the functions of the sorting unit 20, the determination unit 30, and the estimation unit 40. Each electronic circuit is, for example, a single circuit, a composite circuit, a programmed processor, a parallel programmed processor, a logic IC, a GA, an FPGA, an ASIC, or a combination of some or all of these.

As another variation, the functions of the sorting unit 20, the determination unit 30, and the estimation unit 40 may be realized by a combination of software and hardware. That is, a part of the functions of the sorting unit 20, the determination unit 30, and the estimation unit 40 may be realized by dedicated hardware and the rest may be realized by software.

Each of the processor 11 and the electronic circuit 19 is a processing circuitry. That is, even if the configuration of the object detection apparatus 10 is as the configuration illustrated in any one of FIG. 1 to FIG. 9, operation of the sorting unit 20, the determination unit 30, and the estimation unit 40 are performed by the processing circuitry.

Embodiment 2

Figure 10:
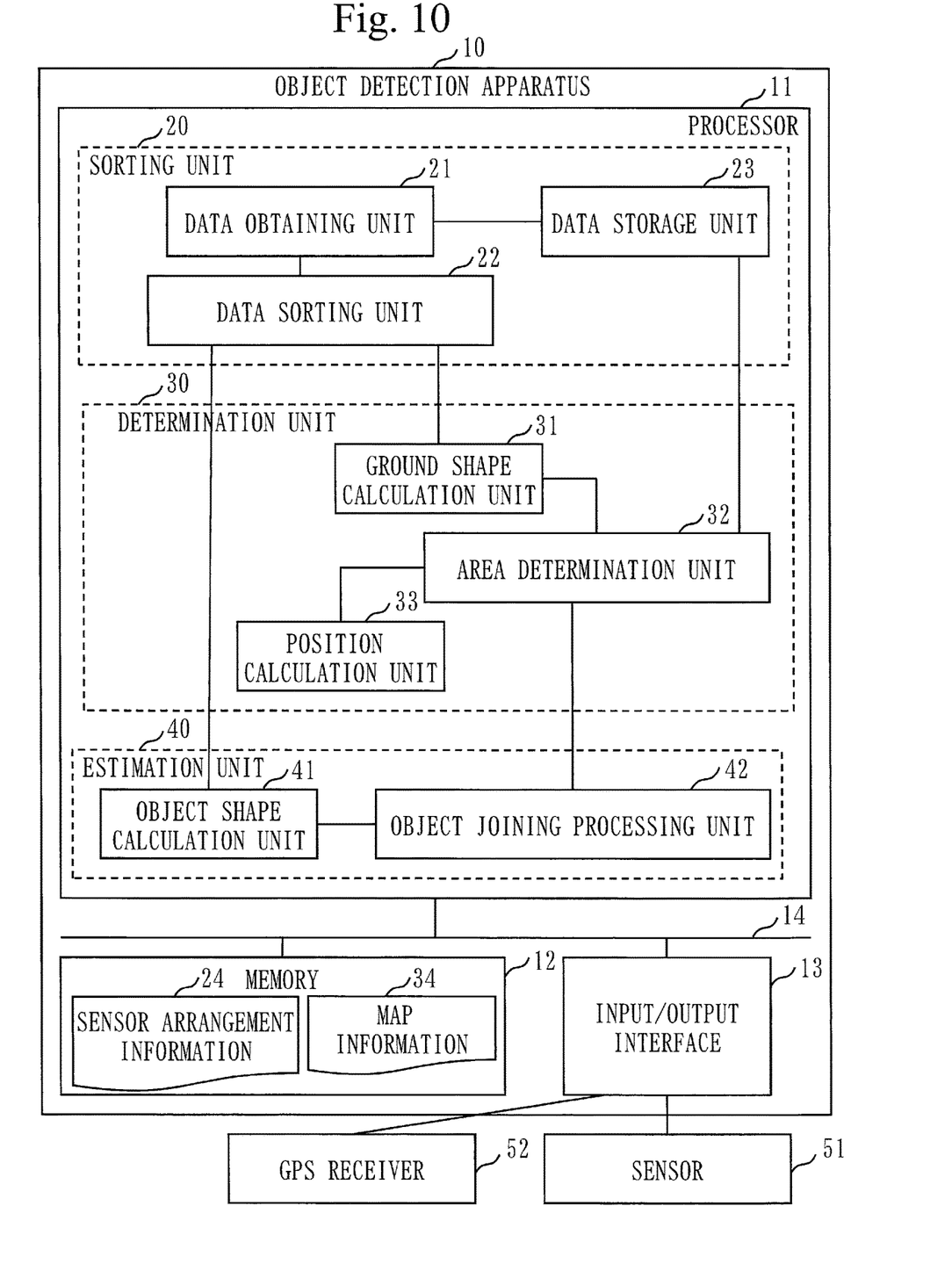
FIG. 10 is a block diagram illustrating a configuration of an object detection apparatus according to Embodiment 2.
Figure 11:
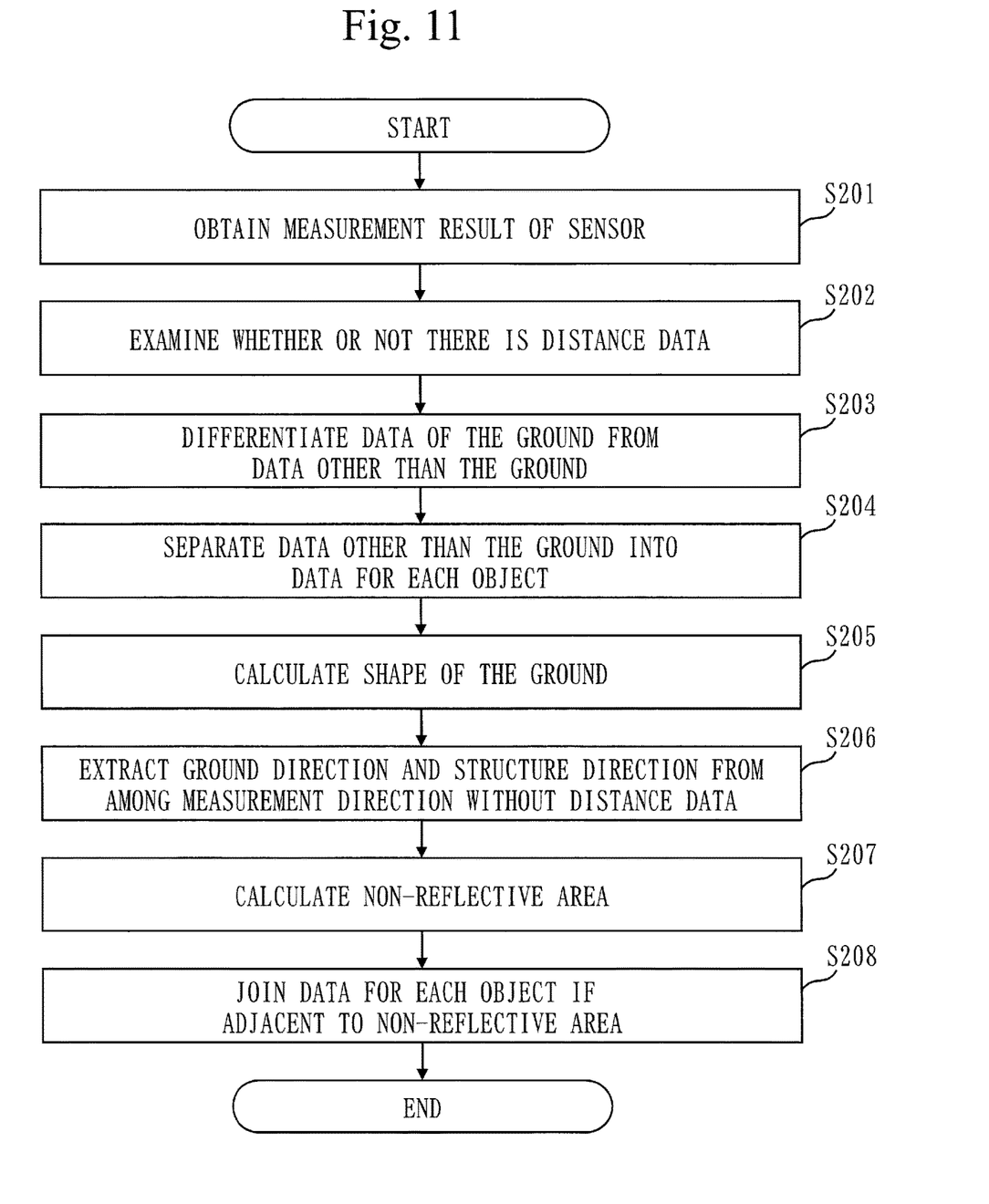
FIG. 11 is a flowchart illustrating operation of the object detection apparatus according to Embodiment 2.

With regard to this embodiment, difference from Embodiment 1 will mainly be described using FIG. 10 and FIG. 11.

*Description of Configuration*

A configuration of an object detection apparatus 10 according to this embodiment will be described by referring to FIG. 10.

In this embodiment, on a vehicle that has the object detection apparatus 10 loaded, a GPS receiver 52 is loaded other than the sensor 51. "GPS" is an abbreviation for Global Positioning System. The object detection apparatus 10 is connected to the OPS receiver 52 by wire or wirelessly.

The determination unit 30 includes, as functional elements, a position calculation unit 33 other than the ground shape calculation unit 31 and the area determination unit 32.

Map information 34 is stored in the memory 12. Position information of a surrounding structure is included in the map information 34.

*Description of Operation*

Operation of the object detection apparatus 10 according to this embodiment will be described by referring to FIG. 10 and FIG. 11. With regard to the operation of the sensor 51, since the operation is the same as that of Embodiment 1, a description will be omitted. By combining the operation of the object detection apparatus 10 and the operation of the sensor 51, an object detection method according to this embodiment is realized.

In Embodiment 1, the non-reflective area is found by using the ground data found based on the data with distance. In this embodiment, not only the ground data but also the non-reflective area in a case where there is a structure in the surroundings is calculated by using position information of a vehicle obtainable by a GPS and the map information 34 including the position information of the structure in the surroundings.

FIG. 11 illustrates the operation of the object detection apparatus 10.

With regard to processes from step S201 to step S205, since the processes are the same as the processes from step S101 to step 105 of Embodiment 1, a description will be omitted.

At step S206 and step S207, the determination unit 30 obtains the position information of the surrounding structure included in the map information 34 stored in the memory 12, from the memory 12. The determination unit 30 determines whether or not a structure exists in the first area based on the position information obtained and the position information of the sensor 51 included in the sensor arrangement information 24. As described above, the first area is the radiation destination area of a signal corresponding to the first data. The first data is the data obtained from the sensor 51 indicating that the distance was not measured.

Specifically, at step S206, the position calculation unit 33 creates position data of the structure in the surroundings with the vehicle to which the sensor 51 is loaded in a center, based on the position information obtained from the GPS receiver 52 and the map information 34, and stores the position data in the memory 12. As with Embodiment 1, with regard to the data without the distance information stored in the memory 12 by the data storage unit 23, the area determination unit 32 extracts the data without the distance data for the measurement toward the ground direction from the sensor 51, from the ground shape data found by the ground shape calculation unit 31 and the position information of the sensor 51 included in the sensor arrangement information 24. Simultaneously, with regard to the data without the distance information, the area determination unit 32 extracts the data without the distance data for the measurement toward a structure direction from the sensor 51 from the position data of the structure stored in the memory 12 by the position calculation unit 33 and the position information of the sensor 51 included in the sensor arrangement information 24.

And, at step S207, the area determination unit 32 estimates the non-reflective area using the data extracted at step S206 and the ground data. The non-reflective area, as illustrated in FIG. 7, can be defined as the area surrounded by the detected points that were able to obtain the distance data with regard to the direction extracted at step S206.

At step S208, the estimation unit 40, as in Embodiment 1, estimates that the one obstacle X exists straddling the first area and the second area if the ground is determined as existing in the first area by the determination unit 30 and if the first area and the second area are adjacent. In this embodiment, as in a case where a structure is determined as existing in the first area by the determination unit 30 and where the first area and the second area are adjacent, the estimation unit 40 estimates that the one obstacle X exists straddling the first area and the second area. As described above, the second area is the radiation destination area of the signal corresponding to the second data. The second data is data obtained from the sensor 51 indicating the distance to one or more obstacles.

*Description of Effect of Embodiment*

According to this embodiment, by using structure data, the non-reflective area not only in the ground direction but also in the direction where there is a structure can be defined, and along with preventing a result of finding a shape of an object based on the detected data from being separated, a result calculated as an object can also be prevented from joining more than necessary, and incorrect detection can be reduced.

REFERENCE SIGNS LIST

10: object detection apparatus, 11: processor, 12: memory, 13: input/output interface, 14: signal line, 19: electronic circuit, 20: sorting unit, 21: data obtaining unit, 22: data sorting unit, 23: data storage unit, 24: sensor arrangement information, 30: determination unit, 31: ground shape calculation unit, 32: area determination unit, 33: position calculation unit, 34: map information, 40: estimation unit, 41: object shape calculation unit, 42: object joining processing unit. 51: sensor, 52: GPS receiver.

The invention claimed is:

1. An object detection apparatus comprising:
a sensor configured to radiate a plurality of signals in different directions, respectively, and observe reflected waves of the radiated signals to measure respective distances to points from which the observed waves were reflected; and
processing circuitry to:
obtain, from the sensor, data indicating a measurement result for each of the plurality of signals radiated from the sensor, and sort the obtained data into
first measurement results corresponding to radiated signals for which reflected waves were not observed, and from which the respective distances could not be measured;
second measurement results corresponding to radiated signals for which reflected waves were observed, and from which the respective distances were measured and determined to be to one or more obstacles; and
third measurement results corresponding to radiated signals for which reflected waves were observed, and from which the respective distances were measured and determined to be to a ground, determine by extrapolation from the third measurement results, whether or not a portion of the ground exists in a first area in the direction in which one of the signals corresponding to the first measurement results was radiated, estimate, in response to determining that a portion of the ground exists in the first area, and that the first area is adjacent to a second area, the second area being in the direction in which one of the signals corresponding to the second measurement results was radiated, that one obstacle exists extending at least from the first area to the second area, and in response to determining that the one object exists extending at least from the first area to the second area, cause an output device to output data to a user indicative of the position and/or distance of the one object.

2. The object detection apparatus according to claim 1, wherein the processing circuitry estimates, when there are two signals corresponding to the second measurement results in the plurality of signals, which are transmitted in the directions of two respective areas adjacent to opposite sides of the first area, that the one obstacle exists extending across the first area into each of the two respective areas, the second area being one of the two respective areas.

3. The object detection apparatus according to claim 2, wherein the processing circuitry calculates, by using the second measurement results, shapes of respective portions of the one obstacle extending into the two respective areas, estimates the shape of a portion of the one obstacle extending across the first area based on a calculation result of the shapes of the respective portions of the one obstacle, and joins the calculation result and an estimation result of the shape of the one obstacle.

4. The object detection apparatus according to claim 1, wherein the processing circuitry calculates, by using the third measurement results, a shape of the ground within an entire area covered by the directions in which the plurality of signals were radiated, and determines whether or not the portion of the ground exists in the first area based on a calculation result of the shape of the ground.

5. The object detection apparatus according to claim 1, wherein the processing circuitry, from a memory that stores map information including position information of a surrounding structure, obtains the position information of the surrounding structure, and determines whether or not the surrounding structure exists in the first area based on the position information obtained and position information of the sensor, and wherein the processing circuitry uses the determination that the surrounding structure exists in the first area to estimate that the one obstacle exists extending at least from the first area to the second area.

6. A vehicle comprising:
the object detection apparatus according to claim 1.

7. An object detection method comprising:
using a sensor to radiate a plurality of signals in different directions, respectively, and observe reflected waves of the radiated signals to measure respective distances to points from which the observed waves were reflected;

using the sensor to observe reflected waves of the radiated signals to measure respective distances to points from which the observed waves were reflected;

using a computer to obtain, from the sensor, data indicating a measurement result for each of the plurality of signals radiated from the sensor, and sort the obtained data into first measurement results corresponding to radiated signals for which reflected waves were not observed, and from which the respective distances could not be measured, second measurement results corresponding to radiated signals for which reflected waves were observed, and from which the respective distances were measured and determined to be to one or more obstacles, and third measurement results corresponding to radiated signals for which reflected waves were observed, and from which the respective distances were measured and determined to be to a ground;

using the computer to determine, by extrapolation from the third measurement results, whether or not a portion of the ground exists in a first area in the direction in which one of the signals corresponding to the first measurement results was radiated;

using the computer to estimate, in response to determining that a portion of the ground exists in the first area, and that the first area is adjacent to a second area, the second area being in the direction in which one of the signals corresponding to the second measurement results was radiated, that one obstacle exists extending at least from the first area to the second area; and in response to determining that the one object exists extending at least from the first area to the second area, using the computer to cause an output device to output data to a user indicative of the position and/or distance of the one object.

8. A non-transitory computer readable medium storing an object detection program causing a computer to execute:
a measurement process of causing a sensor to
radiate a plurality of signals in different directions, respectively, and observe reflected waves of the radiated signals to measure respective distances to points from which the observed waves were reflected, and observe reflected waves of the radiated signals to measure respective distances to points from which the observed waves were reflected;

a sorting process to obtain, from the sensor, data indicating a measurement result for each of the plurality of signals radiated from the sensor, and sort the obtained data into first measurement results corresponding to radiated signals for which reflected waves were not observed, and from which the respective distances could not be measured, second measurement results corresponding to radiated signals for which reflected waves were observed, and from which the respective distances were measured and determined to be to one or more obstacles, and third measurement results corresponding to radiated signals for which reflected waves were observed, and from which the respective distances were measured and determined to be to a ground;

a determination process to determine by extrapolation from the third measurement results, whether or not a portion of the ground exists in a first area in the direction in which one of the signals corresponding to the first measurements was radiated;

an estimation process to estimate, in response to determining that a portion of the ground exists in the first area, and that the first area is adjacent to a second area, the second area being in the direction in which one of the signals corresponding to the second measurement results was radiated, that one obstacle exists extending at least from the first area to the second area; and an output process to, in response to determining that the one object exists extending at least from the first area to the second area, cause an output device to output data to a user indicative of the position and/or distance of the one object.

\* \* \* \* \*